United States Patent
Hwang et al.

(10) Patent No.: US 7,974,175 B2
(45) Date of Patent: Jul. 5, 2011

(54) INFORMATION STORAGE MEDIUM, AND RECORDING/REPRODUCING APPARATUS AND RECORDING/REPRODUCING METHOD

(75) Inventors: Wook-yeon Hwang, Yangpyeong-gun (KR); Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 825 days.

(21) Appl. No.: 11/244,053

(22) Filed: Oct. 6, 2005

(65) Prior Publication Data
US 2006/0087958 A1    Apr. 27, 2006

(30) Foreign Application Priority Data
Oct. 23, 2004 (KR) .................. 10-2004-0085132

(51) Int. Cl.
*G11B 3/70* (2006.01)
*G11B 7/24* (2006.01)
(52) U.S. Cl. ................... 369/272.1; 369/275.1; 369/283
(58) Field of Classification Search ............ 369/94, 369/47.15, 272.1, 275.1, 275.2, 283
See application file for complete search history.

(56) References Cited

U.S. PATENT DOCUMENTS

| | | | |
|---|---|---|---|
| 6,804,797 B2 | 10/2004 | Ko et al. | |
| 7,177,256 B2 * | 2/2007 | Motohashi | 369/59.25 |
| 7,184,377 B2 | 2/2007 | Ito et al. | |
| 7,327,646 B2 | 2/2008 | Park | |
| 7,423,952 B2 * | 9/2008 | Shishido et al. | 369/94 |
| 7,499,383 B2 | 3/2009 | Park et al. | |
| 2001/0026518 A1 | 10/2001 | Shishido | |
| 2002/0114233 A1 | 8/2002 | Sasaki et al. | |
| 2003/0137909 A1 * | 7/2003 | Ito et al. | 369/47.14 |
| 2003/0137910 A1 * | 7/2003 | Ueda et al. | 369/47.14 |
| 2004/0156281 A1 * | 8/2004 | Park | 369/47.14 |
| 2004/0165495 A1 | 8/2004 | Park et al. | |
| 2004/0246852 A1 * | 12/2004 | Hwang et al. | 369/53.17 |
| 2004/0246863 A1 * | 12/2004 | Ando et al. | 369/59.22 |

(Continued)

FOREIGN PATENT DOCUMENTS

EP    1 168 315 A2    1/2002

(Continued)

OTHER PUBLICATIONS

Bill McFerrin, CD Edge, Inc., Information Technology—Multimedia Commands-5 (MMC-5), Oct. 11, 2004.*

(Continued)

*Primary Examiner* — Craig A. Renner
*Assistant Examiner* — Aneeta Yodichkas
(74) *Attorney, Agent, or Firm* — NSIP Law

(57) ABSTRACT

An information storage medium and a recording/reproducing apparatus and method are provided with the ability to extend at least one middle area of an information storage medium comprising two or more recording layers so as to ensure optimal data recording/reproduction. The information storage medium comprises a plurality of recording layers, each including a user data area for recording user data and at least one middle area used by a recording/reproducing apparatus that records/reproduces data on the information storage medium to move among two recording layers, wherein the at least one middle area is extended when the information storage medium is finalized. As a result, when an information storage medium that contains an OPC area for obtaining optimum recording conditions (such as recording power) in an outer circumference thereof is finalized, and if a middle area of the disk is not large enough, the middle area can flexibly be extended.

12 Claims, 7 Drawing Sheets

U.S. PATENT DOCUMENTS

| | | | |
|---|---|---|---|
| 2004/0264322 A1* | 12/2004 | Shishido et al. | 369/47.22 |
| 2005/0025013 A1 | 2/2005 | Yamamoto | |
| 2005/0030864 A1* | 2/2005 | Tokumoto | 369/53.2 |
| 2006/0007847 A1* | 1/2006 | Lee | 369/275.3 |
| 2006/0087958 A1 | 4/2006 | Hwang et al. | |
| 2007/0177472 A1 | 8/2007 | Miura et al. | |
| 2009/0109824 A1 | 4/2009 | Sasaki | |
| 2009/0147644 A1 | 6/2009 | Sasaki | |
| 2010/0135132 A1 | 6/2010 | Kubo et al. | |
| 2010/0142342 A1 | 6/2010 | Hwang et al. | |
| 2010/0142343 A1 | 6/2010 | Hwang et al. | |

FOREIGN PATENT DOCUMENTS

| | | |
|---|---|---|
| EP | 1 329 880 A2 | 7/2003 |
| EP | 1 329 888 A1 | 7/2003 |
| EP | 1 465 165 | 10/2004 |
| EP | 1 465 165 A2 | 10/2004 |
| EP | 1 607 967 | 12/2005 |
| EP | 1 708 179 | 10/2006 |
| JP | 2002-216361 | 8/2002 |
| JP | 2004-288308 A | 10/2004 |
| JP | 2004-295940 A | 10/2004 |
| JP | 2004-303344 | 10/2004 |
| JP | 2008-518376 A | 5/2008 |
| JP | 2010-118145 A | 5/2010 |
| JP | 2010-153028 A | 7/2010 |
| WO | WO 03/038823 | 5/2003 |
| WO | WO 2004-057585 A1 | 7/2004 |
| WO | WO 2004/086374 A1 | 10/2004 |
| WO | WO 2004/086394 | 10/2004 |
| WO | WO 2004/086398 | 10/2004 |
| WO | WO 2005004119 A2 * | 1/2005 |
| WO | WO 2006/038689 A1 | 4/2006 |

OTHER PUBLICATIONS

International Search Report issued in PCT International Application No. PCT/KR2005/003371 on Jan. 12, 2006.

Search Report issued in European Application No. 05856516.9 on Dec. 22, 2008.

Office Action issued in Taiwanese Patent Application No. 094135486 on Aug. 15, 2008.

McFerrin, Bill, Information Technology—Multimedia Commands-5 (MMC-5), Revision 1, Oct. 11, 2004, 12 pages.

U.S. Appl. No. 12/705,848, filed Feb. 15, 2010, Wook-yeon Hwang et al., Samsung Electronics Co., Ltd.

U.S. Appl. No. 12/706,242, filed Feb. 16, 2010, Wook-yeon Hwang et al., Samsung Electronics Co., Ltd.

Office Action issued from the Chinese Patent Office, dated Aug. 7, 2009 in Chinese Patent Application No. 200580035969.1.

Canadian Office Action issued on Mar. 10, 2010, in corresponding Canadian Application No. 2,584,623 (9 pages).

Japanese Office Action issued on Nov. 30, 2010, in counterpart Japanese Application No. 2007-537796 (5 pages, in Japanese, no English translation).

Japanese Office Action issued on Nov. 30, 2010, in counterpart Japanese Application No. 2010-36726 (4 pages, in Japanese, no English translation.

Canadian Office Action issued on Mar. 10, 2010, in counterpart Canadian Application No. 2,584,623 (6 pages).

Japanese Office Action issued on Mar. 29, 2011, in counterpart Japanese Application No. 2010-036726 (3 pages, in Japanese, no English translation).

* cited by examiner

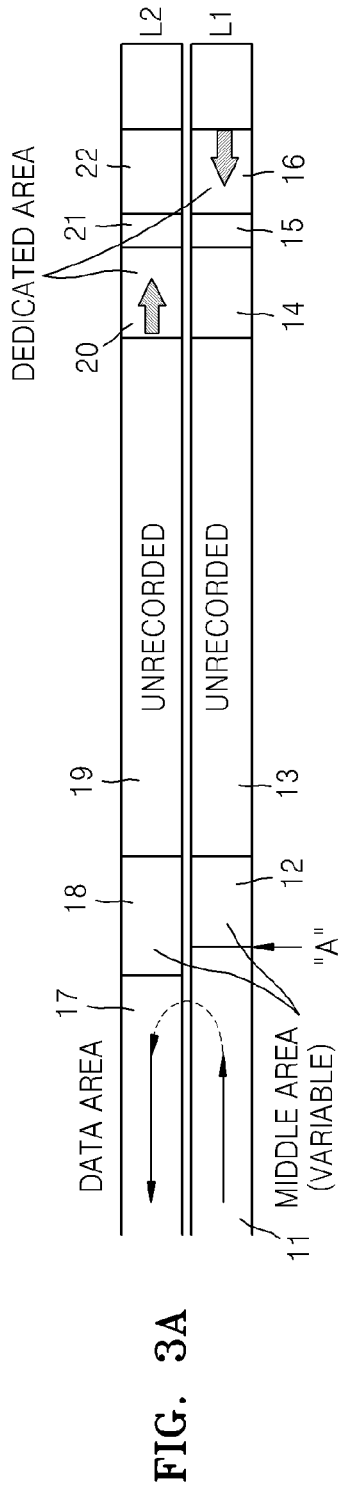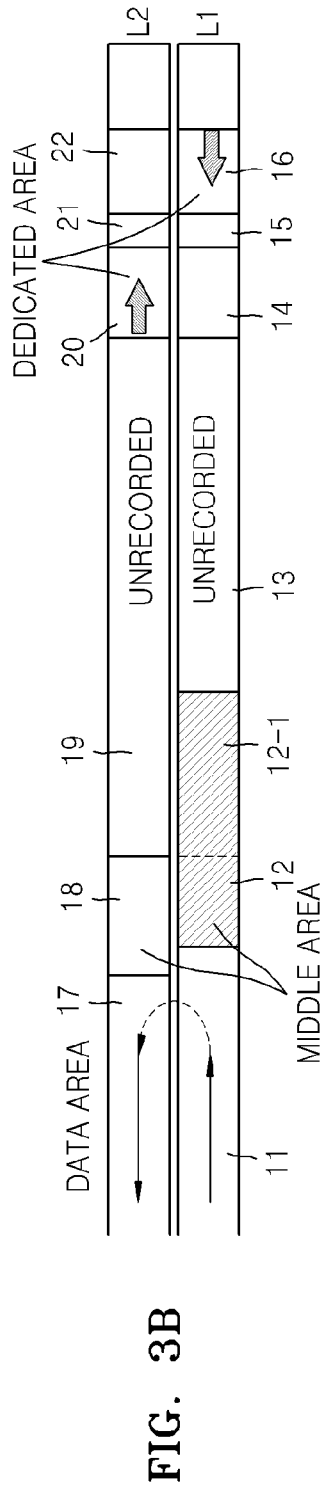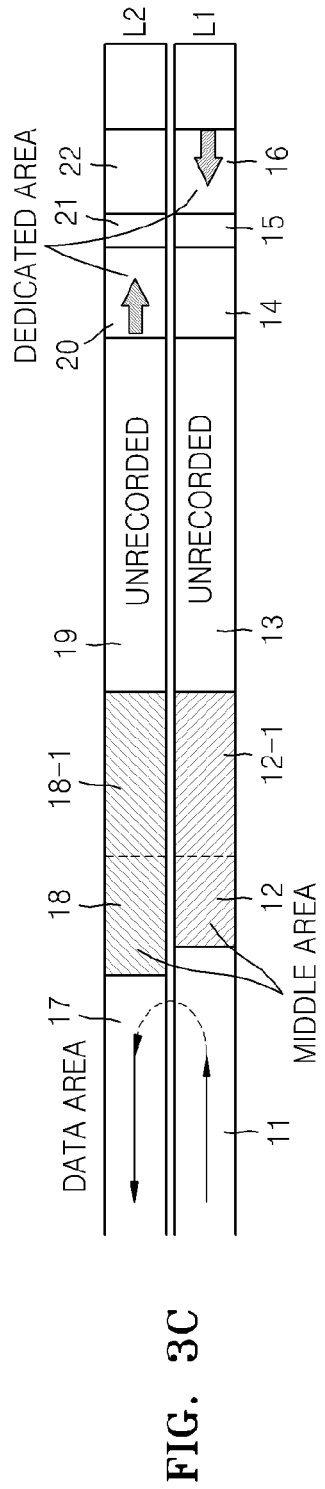

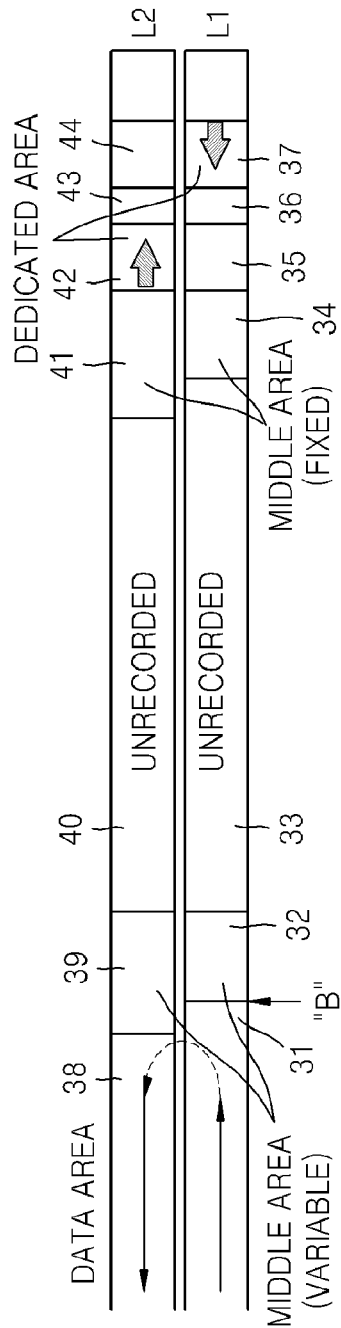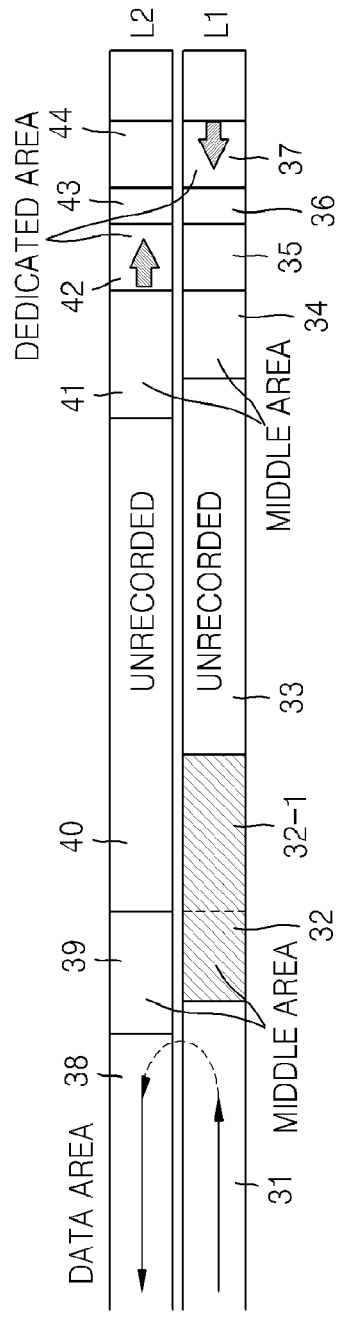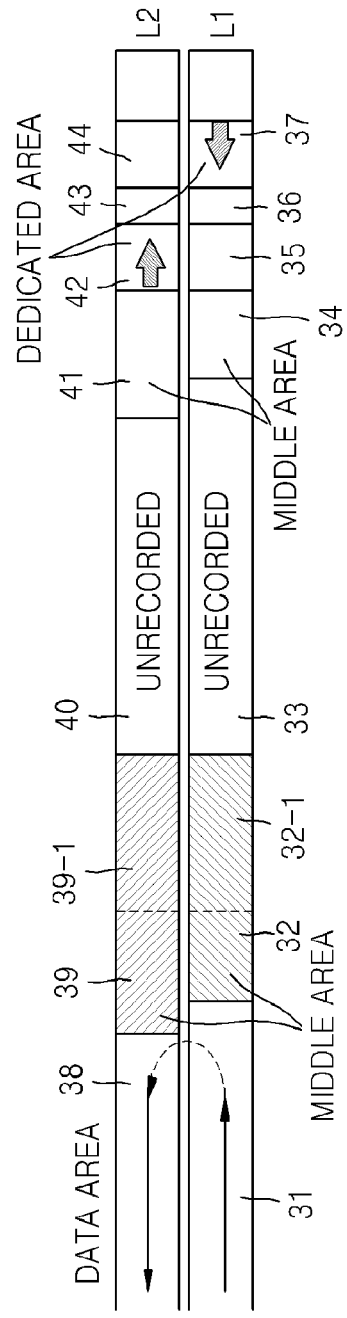

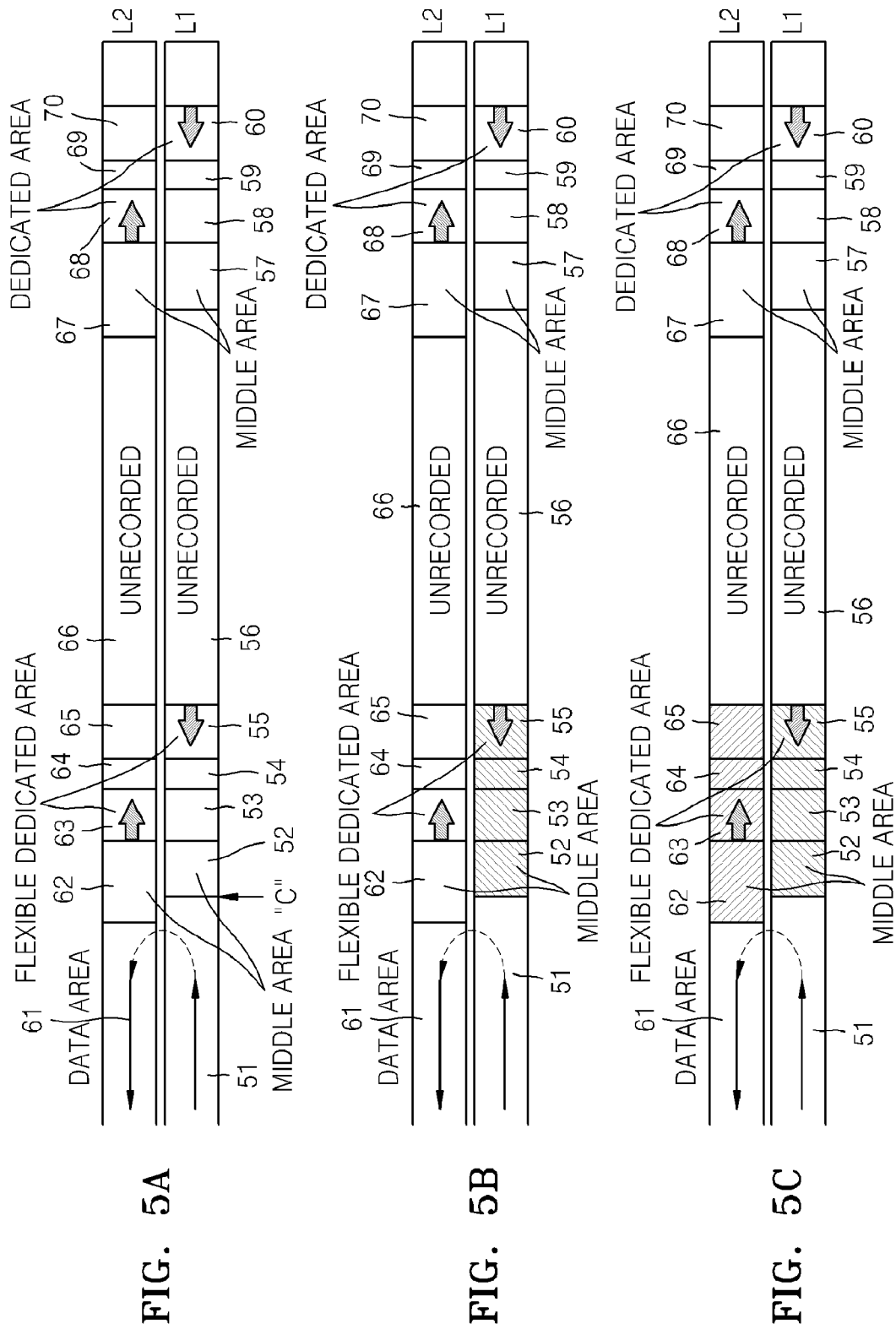

INFORMATION STORAGE MEDIUM, AND RECORDING/REPRODUCING APPARATUS AND RECORDING/REPRODUCING METHOD

CROSS-REFERENCE TO RELATED APPLICATIONS

This application claims the benefit of Korean Patent Application No. 2004-85132 filed on Oct. 23, 2004, in the Korean Intellectual Property Office, the disclosure of which is incorporated herein by reference in its entirety.

BACKGROUND OF THE INVENTION

1. Field of the Invention

The present invention relates to an information storage medium and a recording/reproducing apparatus and method that can flexibly operate a middle area of the information storage medium when the information storage medium is finalized.

2. Related Art

Information storage media, such as optical disks, are widely used in optical pickup devices which record information thereon or reproduce information therefrom in a contactless manner. Such optical disks can be classified as either compact disks (CDs) or digital versatile disks (DVD) according to data recording capacity. Examples of optical disks that can be recorded, deleted, and reproduced include 650 MB CD-Rs, CD-rewritables (RWs), 4.7 GB DVD+R/RWs, DVD-random access memories (RAMs), and DVD-R/RWs. Examples of optical disks that are dedicated for data reproduction include 650 MB CDs and 4.7 GB DVD-ROMs. Further, next-generation high density DVDs or Blu-ray Discs (BDs) having a recording capacity of 15 GB or greater are under development.

FIG. 1A illustrates the structure of an example rewritable optical disk. FIG. 1B illustrates the structure of an example optical disk for data reproduction. As shown in FIG. 1A, the rewritable optical disk 100A includes a lead-in area 110, which is generally located near the inner circumference of the optical disk 100A, a lead-out area 120, which is generally located near the outer circumference of the optical disk 100A, and a user data area 130, which is located between the lead-in and lead-out areas 110 and 120 and in which user data is recorded. Similarly, the optical disk 100B for data reproduction, as shown in FIG. 1B, also includes a lead-in area 110, which is generally located near the inner circumference of the optical disk 100A, a lead-out area 120, which is generally located near the outer circumference of the optical disk 100A, and a user data area 130, which is located between the lead-in and lead-out areas 110 and 120 and in which user data is recorded. As shown in FIG. 1A and FIG. 1B, the lead-in area 110 and in the lead-out area 120 of both the rewritable optical disk 100A and the optical disk for data reproduction 100B are almost identical. However, the lead-in area 110 of the rewritable optical disk 100A, as shown in FIG. 1A, includes an optimum power test zone for optimum power control (OPC). Such an optimum power test zone is not required in the case of the optical disk for data reproduction 100B, as shown in FIG. 1B.

The optical power control (OPC) is utilized to determine the best recording laser power setting for each optical disk and a recording and/or reproducing apparatus combination. Specifically, such an OPC is about recording user data in the optimum power test zone using various recording powers before the recording and/or reproducing apparatus records the user data on the rewritable optical disk to determine an optimum recording power for recording data on an optical disk, such as CD-R, CD-R/RW, DVD-R/RW, HD-DVD.

In the rewritable optical disk 100A, as shown in FIG. 1A, the optimum power test zone of a fixed size is allocated at a fixed location. Thus, it is not possible to allocate an additional optimum power test zone or increase the size of the optimum power test zone on the optical disk. Since the recording characteristics of an optical disk including a plurality of recording layers depend on the recording layer in which data is recorded first, the optimum power test zone for OPC should be placed in consideration of the recording characteristics of the optical disk. In particular, when the optimum power test zone is allocated in an outer circumferential area of the optical disk, the recording characteristics of the outer circumferential area must be considered.

The recording characteristics of the outer circumferential area of the optical disk including a plurality of recording layers are poorer than those of an outer circumferential area of an optical disk having a single recording layer, which must also be taken into consideration. Similarly, in addition to the optimum power test zone, when an area for other use purposes is allocated in the outer circumferential area of the optical disk, the recording characteristics of the outer circumferential area must also be considered.

For an optical disk comprising two recording layers L1 and L2, the recording characteristics of the recording layer L2 depends on whether data has been recorded in the recording layer L1 close to a pickup unit. In the case of sequential data recording, data is always recorded first in the recording layer L1. When test data is recorded in the optimum power test zone for OPC included in the recording layer L2, a pre-recorded zone should be allocated in the recording layer L1 in advance since the test data must be recorded first in the recording layer L1.

However, allocation of such a pre-recorded zone increases the manufacturing cost of a data recording and/or reproducing apparatus. Hence, the allocation of the pre-recorded zone and the optimum power test zone for OPC needs to be selectively determined. In this case, the optical disk requires an OPC zone at a predetermined location and an OPC zone that can selectively be used by a drive system.

In terms of time, to effectively record data in the outer circumferential area of an optical disk having two recording layers L1 and L2, the position of a middle area in the optical disk may be different from the same position in an optical disk having a single recording layer. In this case, diverse layouts of the optical disk having the two recording layers L1 and L2 are required to allocate the optimum power test zone for OPC in the outer circumferential area of the optical disk.

Since the middle area is used when a pickup unit of a drive system moves among two or more recording layers, the middle area must be longer than a predetermined length to achieve a desired jump performance. When the optical disk having the structure described above is finalized to stably determine the middle area, the middle area may be insufficient for data recording.

Accordingly, there is a need for an information storage medium comprising multiple recording layers provided with at least one middle area used by a recording and/or reproducing apparatus to move among the recording layers such that the middle area can be flexibly extended when the information storage medium is finalized. Also needed is a recording and/or reproducing apparatus provided with the ability to extend the middle area of an information storage medium comprising two or more recording layers and to record data of a predetermined pattern in the extended middle area.

SUMMARY OF THE INVENTION

Various aspects and example embodiments of the present invention advantageously provide an information storage medium and a recording/reproducing apparatus and method that can flexibly operate a middle area of the information storage medium for efficient data recording, when the information storage medium is finalized.

According to an aspect of the present invention, there is provided an information storage medium including at least one middle area used by a recording/reproducing apparatus that records/reproduces data on/from the information storage medium to move among multiple recording layers, wherein the at least one middle area is extended when the information storage medium is finalized.

A dedicated area for a special purpose may be disposed after the at least one middle area, and, when the information storage medium is finalized, the at least one middle area may be extended to at least a portion of the dedicated area.

The dedicated area may include a test area for testing data recording/reproducing characteristics of the information storage medium. Data having lead-out properties may be recorded in the at least one middle area.

The middle area may variably be disposed after a user data area where user data is recorded, an unrecorded area where the user data is not recorded may remain unrecorded, such that the at least one middle area may be extended to at least a portion of the unrecorded area when the information storage medium is finalized.

The at least one middle area may include a first middle area variable disposed after the user data area where the user data is recorded and a second middle area fixedly disposed at a predetermined position in an outer circumference of the information storage medium, wherein, when the information storage medium is finalized, the first middle area may be extended to the at least portion of the unrecorded area where the user data is not recorded.

The at least one middle area may variably be disposed after the user data area where the user data is recorded, a dedicated area for a special purpose may be disposed after the at least one middle area, and the middle area may be extended to the at least portion of the dedicated area when the information storage medium is finalized.

According to another aspect of the present invention, a recording/reproducing apparatus is provided for recording or reproducing data on or from an information storage medium. Such a recording/reproducing apparatus includes: a writing/reading unit which records the data on the information storage medium or reads the data from the information storage medium; and a control unit which controls the writing/reading unit to record the data on the information storage medium or read the data from the information storage medium and, when the information storage medium is finalized, extends at least one middle area that is formed in the information storage medium and used by the writing/reading unit to move among at least two recording layers of the information storage medium.

According to another aspect of the present invention, there is provided a method of recording or reproducing data on or from an information storage medium. The method includes extending at least one middle area that is formed in the information storage medium and used by a recording/reproducing apparatus recording or reproducing data on or from the information storage medium to move among at least two recording layers of the information storage medium when the information storage medium is finalized.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 3A illustrates the structure of an optical disk according to another embodiment of the present invention;

FIG. 3B illustrates a first middle area of a first recording layer that is extended, when an optical disk shown in FIG. 3A is finalized;

FIG. 3C illustrates a second middle area of a second recording layer that is extended, when an optical disk has the structure shown in FIG. 3B;

FIG. 4A illustrates the structure of an optical disk according to yet another embodiment of the present invention;

FIG. 4B illustrates a first middle area of a first recording layer that is extended, when an optical disk shown in FIG. 4A is finalized;

FIG. 4C illustrates a third middle area of a second recording layer that is extended when an optical disk has the structure shown in FIG. 4B;

FIG. 5A illustrates the structure of an optical disk according to another embodiment of the present invention;

FIG. 5B illustrates a first middle area of a first recording layer that is extended, when an optical disk shown in FIG. 5A is finalized;

FIG. 5C illustrates a third middle area of a second recording layer that is extended, when an optical disk has the structure shown in FIG. 5B.

DETAILED DESCRIPTION OF THE EMBODIMENTS

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1A:
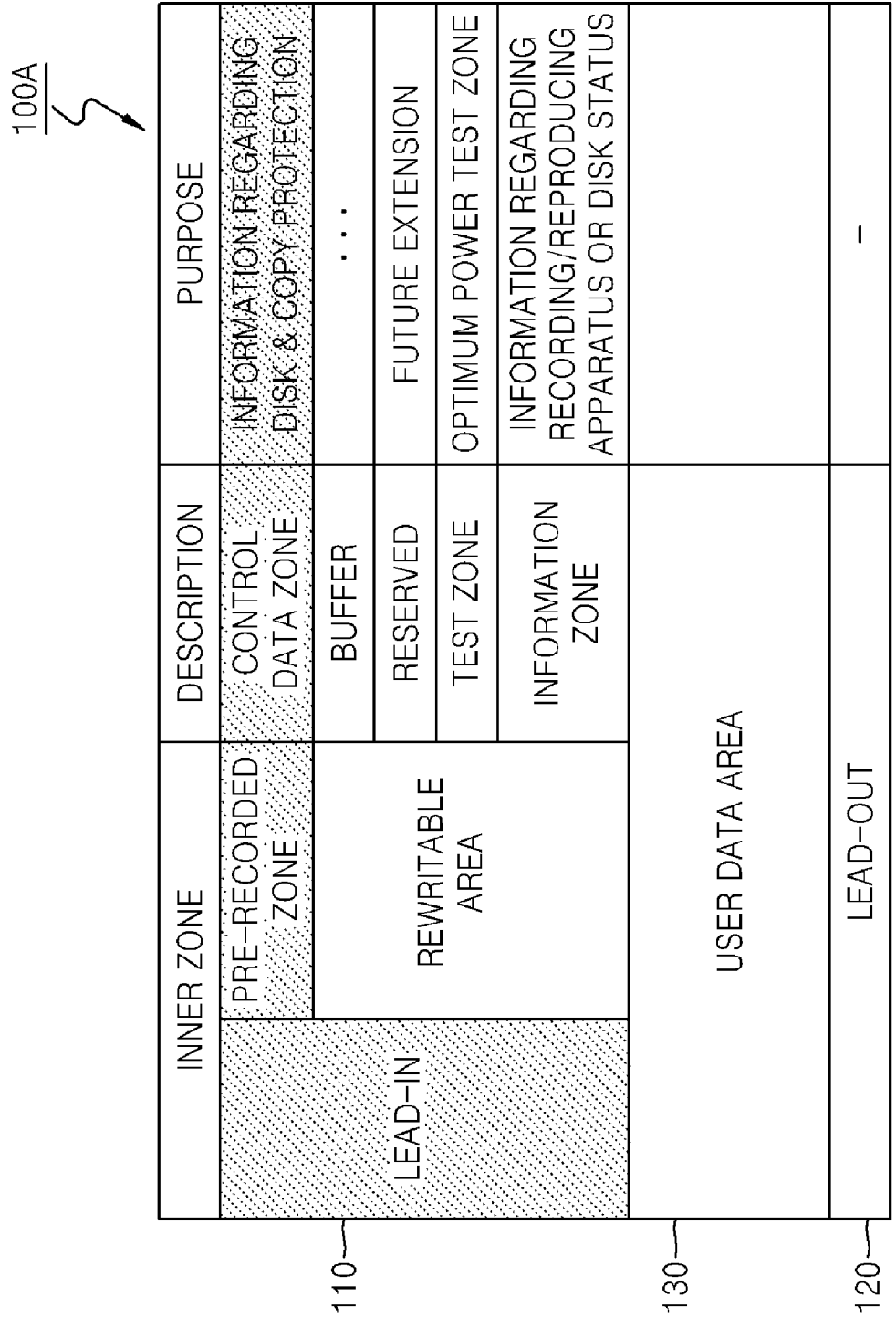
FIG. 1A illustrates the structure of an example rewritable optical disk.
Figure 1B:
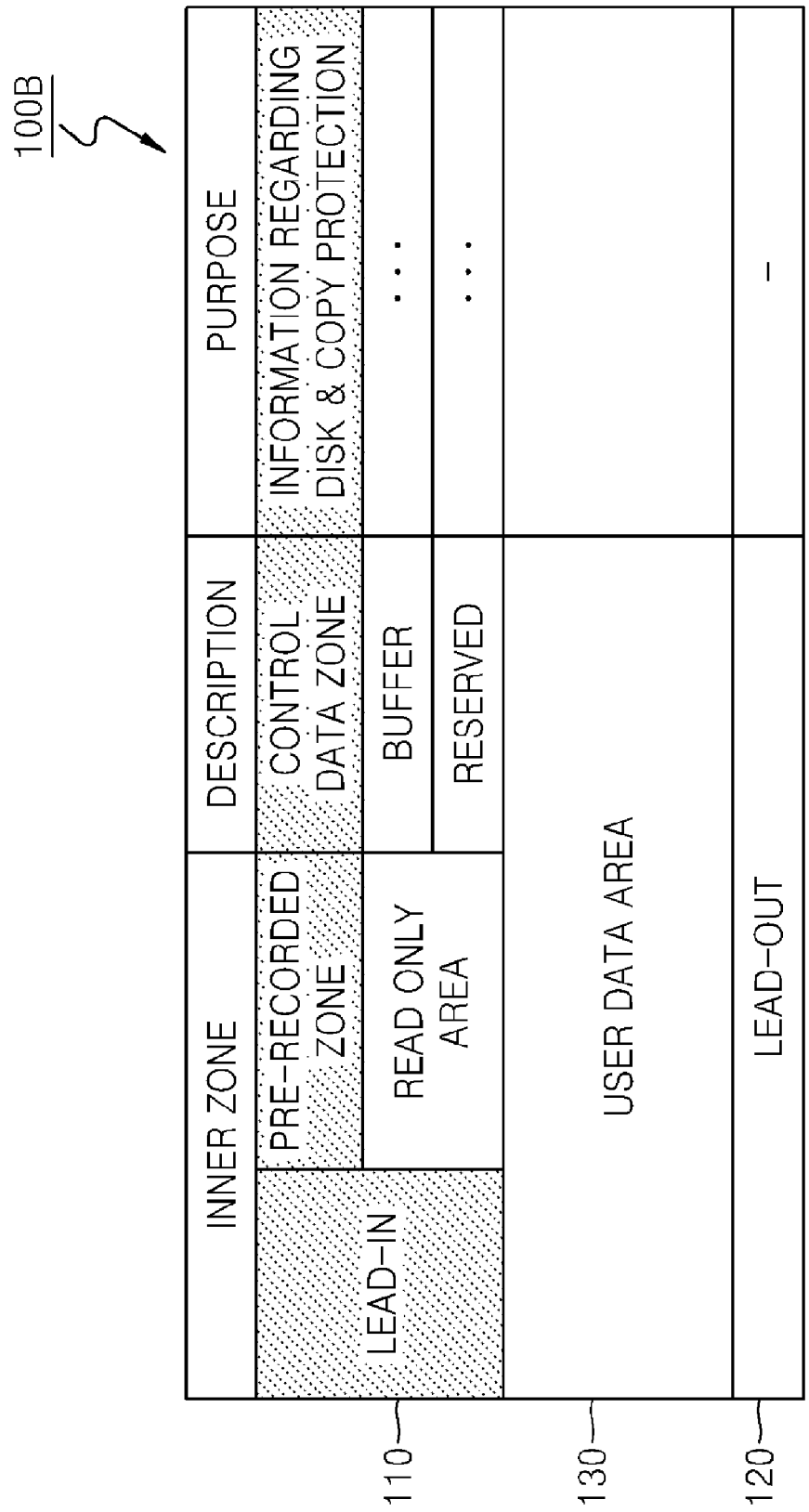
FIG. 1B illustrates the structure of an example optical disk for data reproduction.
Figure 2A:
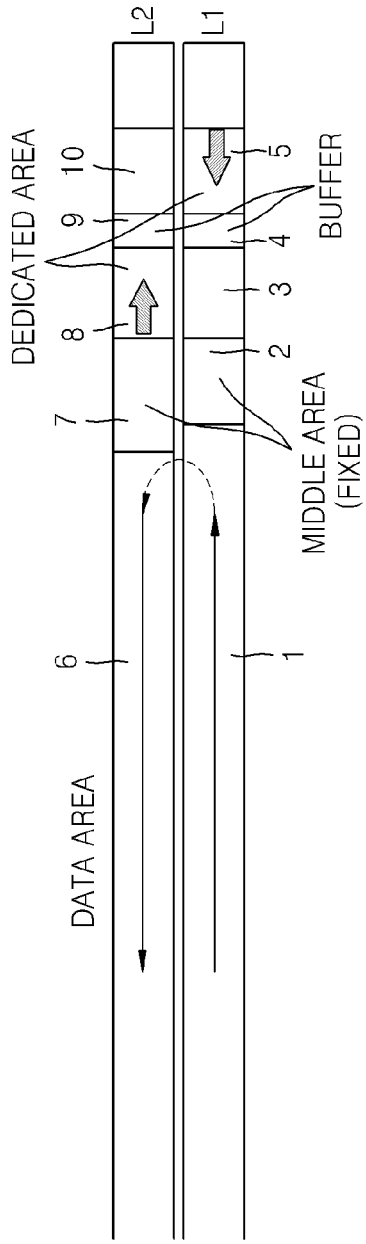
FIG. 2A illustrates the structure of an optical disk according to an embodiment of the present invention.

FIG. 2A illustrates the structure of an optical disk according to an embodiment of the present invention. The optical disk illustrated in FIG. 2A is a dual-layer optical disk comprising two recording layers, that is, first and second recording layers L1 and L2. In the disk structure illustrated in FIG. 2A, middle areas and dedicated areas are fixed at predefined positions in an outer circumference of the optical disk. Data can be recorded on the dual-layer optical disk in an opposite track path (OTP) manner. For example, data can be recorded on the first recording layer L1 from an inner circumference to an outer circumference of the first recording layer L1, and on the second recording layer L2 from an outer circumference to an inner circumference of the second recording layer L2.

Referring to FIG. 2A, the first recording layer L1 includes a first data area 1 and a first outer area. The first outer area includes a first middle area 2, a first unused area 3, a first buffer area 4, and a first dedicated area 5, which are sequentially disposed from an inner circumference of the optical disk to an outer circumference thereof. Similarly, the second recording layer L2 includes a second data area 6 and a second outer area. The second outer area includes a second middle area 7, a second dedicated area 8, a second buffer area 9, and a second unused area 10, which are sequentially disposed from the inner circumference of the optical disk to the outer circumference thereof.

The first data area 1 of the first recording layer L1 and the second data area 6 of the second recording layer L2 represent areas where user data is recorded. In the first middle area 2 and the second middle area 7, a predetermined pattern of data indicating the end of the first and second data areas 1 and 6 is recorded respectively. A data recording and/or reproducing apparatus reads and decodes the predetermined pattern of data and recognizes that the areas in which the predetermined pattern of data is recorded are the first and second middle areas 2 and 7, and not the first and second data areas 1 and 6. Generally, the predetermined pattern of data has lead-out properties.

The first and second dedicated areas 5 and 8 are used by the data recording and/or reproducing apparatus for special (or predetermined) purposes. For example, the first and second dedicated areas 5 and 8 may be used as test areas for optimum power control (OPC). However, the first and second dedicated area 5 and 8 may also be used for purposes other than as the test areas. For example, information regarding data recording performed before a drive system records user data may be recorded in the first and second dedicated areas 5 and 8. In addition, information regarding what data is recorded by which data recording and/or reproducing apparatus may also be recorded in the first and second dedicated areas 5 and 8 of the first and second recording layers L1 and L2 respectively.

As their name indicates, the first and second unused areas 3 and 10 represent areas that are not used at all. Recording characteristics of optical disks including a plurality of rewritable recording layers depend on a recording layer in which data is recorded first. In particular, outer circumferential areas of the optical disks have poorer recording characteristics than inner circumferential areas thereof. Therefore, an area in the second recording layer L2, which corresponds to the first dedicated area 5 in the first recording layer L1, is designated as the second unused area 10 such that no data is recorded in the second unused area 10. Similarly, an area in the first recording layer L1, which corresponds to the second dedicated area 8, is designated as the first unused area 3 such that no data is recorded in the first unused area 3.

If the first and second dedicated areas 5 and 8 are used as test areas, and data is to be recorded in the second recording layer L2, a laser beam passes through the first recording layer L1 and is incident on the second recording layer L2. The laser beam passes through the first unused area 3 and data is test-recorded in the second dedicated area 8. Then, a recording condition for the second recording layer L2 is identified in consideration of attribute parameters of the second recording layer L2 in addition to the test-recording result.

The first and second buffer areas 4 and 9 are formed in consideration of the eccentricity of the optical disk and a size of an irradiated beam. In other words, when a laser beam is focused on a location in the second recording layer L2 though an object lens of the data recording and/or reproducing apparatus, an area in the first recording layer L1 corresponding to a radius of the laser beam is affected by the laser beam. The sizes of the first and second buffer areas 4 and 9 can be predetermined according to the effects of a laser beam irradiated to other recording layers to record data, the size of the optical beam, and the eccentricity of the optical disk.

To record data using the first and second dedicated areas 5 and 8 in the disk structure as shown in FIG. 2A as test areas, an OPC test is conducted in the first and second dedicated areas 5 and 8 before data is recorded in the first and second data areas 1 and 6 of the first and second recording layers L1 and L2 respectively. Then, the data is recorded from an inner circumference of the first recording layer L1 to an outer circumference thereof. After data recording in the first data area 1 of the first recording layer L1 is completed, data is recorded from an outer circumference of the second recording layer L2 to an inner circumference thereof. When data recording in the second data area 6 of the second recording layer L2 is completed, disk finalization is performed. That is, data having lead-out properties (for example, 00h) is recorded in the first and second middle areas 2 and 7 of the first and second recording layers L1 and L2 respectively.

Figure 2B:
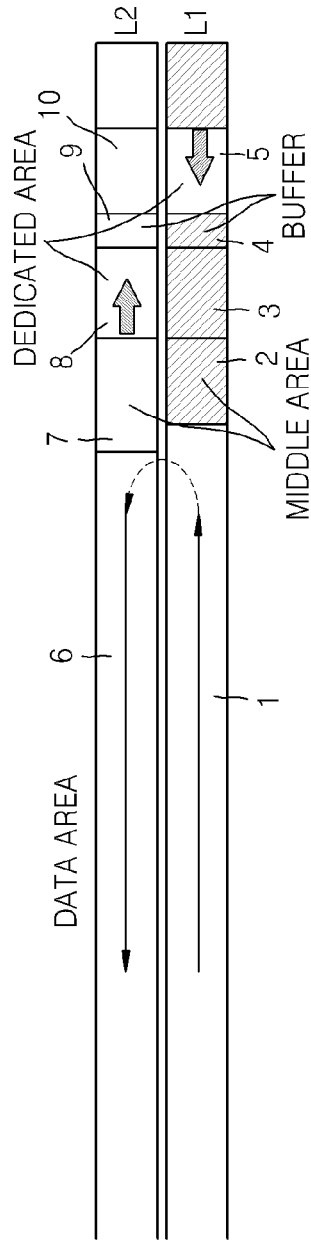
FIG. 2B illustrates a first middle area of a first recording layer that is extended, when an optical disk shown in FIG. 2A is finalized.

If a predetermined space for the first and second middle areas 2 and 7 of the first and second recording layers L1 and L2 is not large enough, the first and second middle areas 2 and 7 can be extended as illustrated in FIG. 2B.

FIG. 2B illustrates the first middle area 2 of the first recording layer L1 that is extended when the optical disk shown in FIG. 2A is finalized (i.e., data having lead-out properties is recorded in the first and second middle areas 2 and 7 upon completion of data recording on the first and second recording layers L1 and L2). Referring to FIG. 2B, the first middle area 2 can be extended to the first dedicated area 5, which has already been used, thereby covering the first unused area 3 and the first buffer area 4. In other words, data having lead-out properties may be recorded as far as the first dedicated area 5. In FIG. 2B, the extended first middle area 2 is indicated by diagonal lines. The first middle area 2 in FIG. 2B is extended to the first dedicated area 5, thereby covering the first unused area 3 and the first buffer area 4. However, the first middle area 2 may also be extended up to a position between the first unused area 3 and the first dedicated area 5 of the first recording layer L1.

Figure 2C:
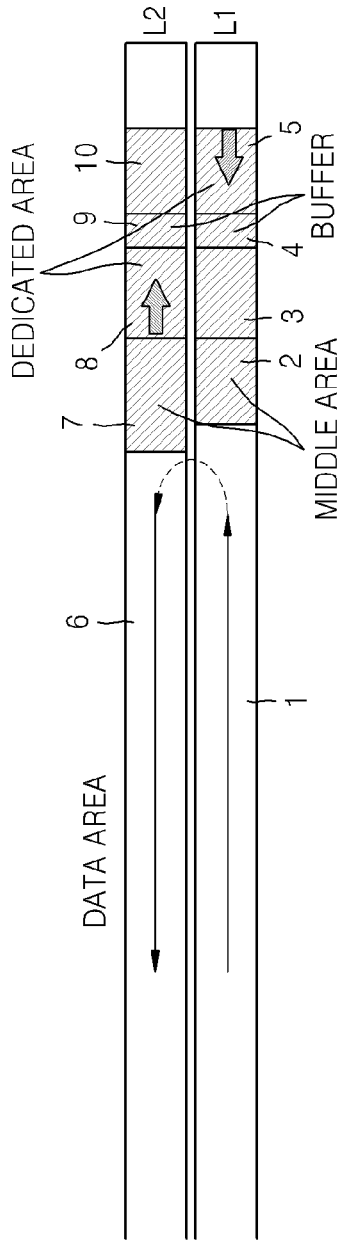
FIG. 2C illustrates a second middle area of a second recording layer that is extended when an optical disk has the structure shown in FIG. 2B.

FIG. 2C illustrates the second middle area 7 of the second recording layer L2 that is extended when the optical disk has the structure illustrated in FIG. 2B. Referring to FIG. 2C, the second middle area 7 is extended to the second unused area 10, covering the second dedicated area 8 and the second buffer area 9.

FIG. 3A illustrates the structure of an optical disk according to another embodiment of the present invention. The optical disk is a dual-layer optical disk comprising two recording layers, that is, first and second recording layers L1 and L2. However, in the structure of the optical disk illustrated in FIG. 3A, positions of middle areas are flexible; only dedicated areas are fixed at predefined positions on the first recording layer L1 and the second recording layer L2 respectively.

In addition, when data is to be recorded on the optical disk having the first and second recording layers L1 and L2, if the capacity of user data to be recorded is smaller than the total recordable capacity of the optical disk, the data recording and/or reproducing apparatus determines the size of a data area in each of the first and second recording layers L1 and L2 and flexibly places the middle areas.

Since a start position of the data area in each of the first and second recording layers L1 and L2 is predetermined, once the capacity of user data to be recorded is determined, an end position of the data area can be determined. The determined size of the data area should be smaller than the original size of the data area; accordingly, the size of an outer area in each of the first and second recording layers L1 and L2 should increase.

Referring to FIG. 3A, the first recording layer L1 includes the data area and a first outer area. The data area includes a first user data area 11 where user data is actually recorded, a first middle area 12, and a first unrecorded area 13, which are sequentially disposed from an inner circumference of the optical disk to an outer circumference thereof. The first outer area includes a first unused area 14, a first buffer area 15, and a first dedicated area 16.

Similarly, the second recording layer L2 includes the data area and a second outer area. The data area includes a second user data area 17 where user data is actually recorded, a second middle area 18, and a second unrecorded area 19 sequentially disposed from the inner circumference of the optical disk to the outer circumference thereof. The second outer area includes a second dedicated area 20, a second buffer area 21, and a second unused area 22.

FIG. 3B illustrates the first middle area 12 of the first recording layer L1 that is extended when the optical disk shown in FIG. 3A is finalized. Referring to FIG. 3B, the first middle area 12 of the first recording layer L1 is extended to a portion 12-1 of the first unrecorded area 13.

FIG. 3C illustrates the second middle area 18 of the second recording layer L2 that is extended when the optical disk has the structure illustrated in FIG. 3B. Referring to FIG. 3C, the second middle area 18 of the second recording layer L2 is extended to a portion 18-1 of the second unrecorded area 19.

Referring to FIG. 3A, if data is recorded up to a point "A" in the first user data area 11 of the first recording layer L1, the first middle area 12 is formed right after the point "A". Referring to FIG. 3B, data is recorded in the first middle area 12. If the first middle area 12 is not large enough, the data invades the first unrecorded area 13 and is recorded there. Referring to FIG. 3C, after data recording in the first middle area 12 of the first recording layer L1 is completed, data is recorded in the second middle area 18 of the second recording layer L2. If the second middle area 18 of the second recording layer L2 is not large enough, the data invades the second unrecorded area 19 of the data area and is recorded there.

FIG. 4A illustrates the structure of an optical disk according to another embodiment of the present invention. The optical disk is also a dual-layer optical disk comprising two recording layers, that is, first and second recording layers L1 and L2. However, in the disk structure illustrated in FIG. 4A, middle areas are fixed at predefined positions, or flexibly allocated in an outer circumference of the optical disk, whereas dedicated areas are fixed at predefined positions in the outer circumference of the optical disk.

Referring to FIG. 4A, a first recording layer L1 includes a data area and a first outer area. The data area includes a first user data area 31 where user data is actually recorded, a first middle area 32, and a first unrecorded area 33, which are sequentially disposed from an inner circumference of the optical disk to an outer circumference thereof. The first outer area includes a fixed second middle area 34, a first unused area 35, a first buffer area 36, and a first dedicated area 37.

A second recording layer L2 includes a data area and a second outer area. The data area includes a second user data area 38 where user data is actually recorded, a third middle area 39, and a second unrecorded area 40, which are sequentially disposed from the inner circumference of the optical disk to the outer circumference thereof. The second outer area includes a fixed fourth middle area 41, a second dedicated area 42, a second buffer area 43, and a second unused area 44.

FIG. 4B illustrates the first middle area 32 of the first recording layer L1 that is extended when the optical disk shown in FIG. 4A is finalized. Referring to FIG. 4B, the first middle area 32 of the first recording layer L1 is extended to a portion 32-1 of the first unrecorded area 33.

FIG. 4C illustrates the third middle area 39 of the second recording layer L2 that is extended when the optical disk has the structure illustrated in FIG. 4B. Referring to FIG. 4C, the third middle area 39 of the second recording layer L2 is extended to a portion 39-1 of the second unrecorded area 40.

Referring to FIG. 4A, if data is recorded up to a point "B" in the first user data area 31 of the first recording layer L1, the first middle area 32 is formed right after the point "B". Referring to FIG. 4B, data is recorded in the first middle area 32. If the first middle area 32 is not large enough, the data invades the first unrecorded area 33 and is recorded there. Referring to FIG. 4C, after data recording in the first middle area 32 and the portion 32-1 of the first recording layer L1 is completed, data is recorded in the third middle area 39 of the second recording layer L2. If the third middle area 39 of the second recording layer L2 is not large enough, the data invades the second unrecorded area 40 of the data area and is recorded there.

The disk structure of FIG. 3A is different from that of FIG. 4A in that the first and second middle areas 12 and 18 of the first and second recording layers L1 and L2 illustrated in FIG. 3A are flexible while the second and fourth middle areas 34 and 41 of the first and second recording layers L1 and L2 illustrated in FIG. 4A are initially fixed at predefined positions and the first and third middle areas 32 and 39 are further arranged at a portion where data recording ends in the data areas.

FIG. 5A illustrates the structure of an optical disk according to another embodiment of the present invention. Similarly to FIGS. 3A-3C and FIGS. 4A-4C, the optical disk is also a dual-layer optical disk comprising two recording layers, that is, first and second recording layers L1 and L2. However, in the structure of the optical disk illustrated in FIG. 5A, middle areas and dedicated areas are fixed at predefined positions, or flexibly placed in an outer circumference of the optical disk.

Referring to FIG. 5A, a first recording layer L1 includes a data area and a first outer area. The data area includes a first user data area 51 where user data is actually recorded, a first middle area 52, a first unused area 53, a first buffer area 54, a first dedicated area 55, and a first unrecorded area 56, which are sequentially disposed from an inner circumference of the optical disk to an outer circumference thereof. The first outer area includes a fixed second middle area 57, a second unused area 58, a second buffer area 59, and a second dedicated area 60.

A second recording layer L2 includes a data area and a second outer area. The data area includes a second user data area 61 where user data is actually recorded, a third middle area 62, a third dedicated area 63, a third buffer area 64, a third unused area 65, and a second unrecorded area 66, which are sequentially disposed from the inner circumference of the optical disk to an outer circumference thereof. The second outer area includes a fourth middle area 67, a fourth dedicated area 68, a fourth buffer area 69, and a fourth unused area 70.

FIG. 5B illustrates the first middle area 52 of the first recording layer L1 that is extended when the optical disk of FIG. 5A is finalized. Referring to FIG. 5B, the first middle area 52 may be extended to the first dedicated area 55, which has already been used, covering the first unused area 53 and the first buffer area 54. In other words, data having lead-out properties may be recorded as far as the first dedicated area 55. In FIG. 5B, the first middle area 52 is extended to the first dedicated area 55, covering the first unused area 53 and the first buffer area 54. However, the first middle area 52 may also be extended to somewhere between the first unused area 53 and the first dedicated area 55.

FIG. 5C illustrates the third middle area 62 of the second recording layer L2 that is extended when the optical disk has the structure illustrated in FIG. 5B. Referring to FIG. 5C, the third middle area 62 may be extended to the third dedicated area 65, which has already been used, covering the third unused area 63 and the third buffer area 64.

It can be seen from FIG. 5A that the first and third middle areas 52 and 62 and the first and third dedicated areas 55 and 63 of the first and second recording layers L1 and L2 are flexible. Initially, the second and fourth middle areas 57 and 67 and the second and fourth dedicated areas 60 and 68 of the first and second recording layers L1 and L2 are fixed at predefined positions in the outer circumference of the optical disk. However, the first and third middle areas 52 and 62 and the first and third dedicated areas 55 and 63 of the first and second recording layers L1 and L2 may be flexibly extended according to an amount of data to be recorded. In other words, when a drive system is aware of the amount of data to be recorded on the optical disk, the first and third middle areas 52 and 62 or the first and third dedicated areas 55 and 63 are extended and formed right after a point "C" up to which data is to be recorded as illustrated in FIG. 5A.

Before data is recorded in the data areas, it is test-recorded in the dedicated areas if the dedicated areas are used as test areas. As illustrated in FIG. 5A, if the data is recorded up to the point "C" in the first user data area 51, the first middle area 52 is formed right after the point "C".

Referring to FIG. 5B, data is recorded in the first middle area 52 to finalize the optical disk. If the first middle area 52 is not large enough, the data invades up to the first dedicated area 55 and is recorded there. Referring to FIG. 5C, after data recording in the first middle area 52 of the first recording layer L1 is completed, data is recorded in the third middle area 62 of the second recording layer L2. If the third middle area 62 is not large enough, the data invades up to the third unused area 65 and is recorded there.

Figure 6:
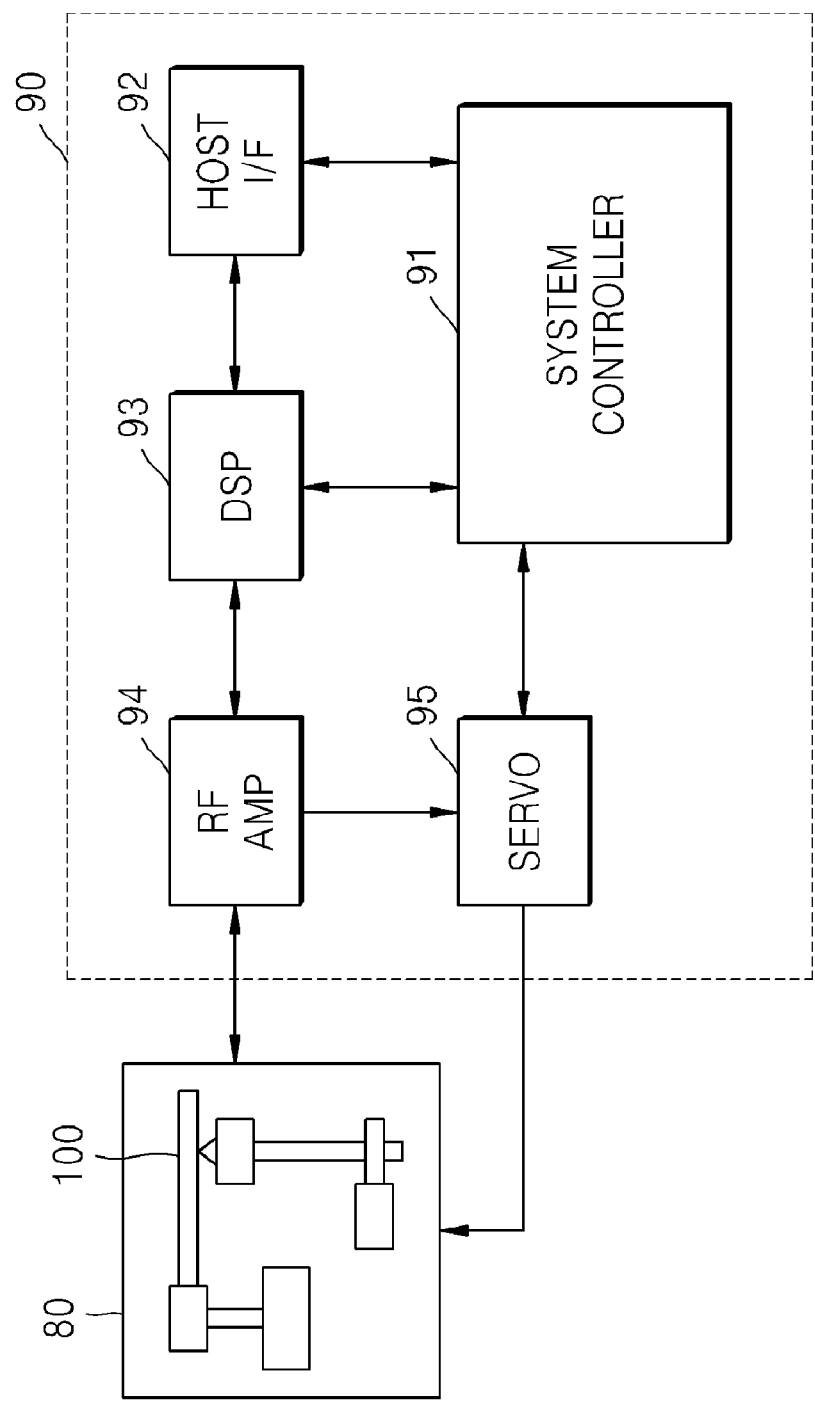
FIG. 6 is a schematic block diagram of an example recording/reproducing apparatus utilizing an optical disk according to an embodiment of the present invention.

Turning now to FIG. 6, a schematic block diagram of an example data recording and/or reproducing apparatus utilizing a disk 100 according to an embodiment of the present invention is illustrated. Referring to FIG. 6, the data recording and/or reproducing apparatus includes a writing/reading unit 80 and a control unit 90. For purposes of brevity, the data recording and/or reproducing apparatus, albeit in whole or in part, can also be referred to as a drive system which can be internal (housed within a host) or external (housed in a separate box that connects to a host (not shown). In addition, the disk 100 can be any optical disk such as, for example, CD-R, CD-R/RW, DVD-R/RW, HD-DVD implemented in the manner as described with reference to FIGS. 2A-2C, FIGS. 3A-3C, FIGS. 4A-4C, and FIGS. 5A-5C.

The writing/reading unit 80, which includes a pickup unit, records data on the disk 100, which is an optical information storage medium according to the present invention, and reads the recorded data from the disk 100 for data reproduction. The control unit 90 controls the writing/reading unit 80 so that the writing/reading unit 80 can record data on the disk 100 according to a predetermined file system, and process data read by the writing/reading unit 80 to obtain valid data. In particular, when the disk 100 including a dedicated area that is used to record data in an outer circumference thereof is finalized, if a middle area turns out to be insufficient, the control unit 90 extends the middle area.

As shown in FIG. 6, the control unit 90 includes a system controller 91, a host interface (I/F) 92, a digital signal processor (DSP) 93, a radio frequency amplifier (RF AMP) 94, and a servo 95. For data recording, the host I/F 92 receives a write command from a host (not shown) and transmits the write command to the system controller 91. The system controller 91 controls the DSP 93 and the servo 95 to execute the write command received from the host I/F 92. The DSP 93 receives data to be recorded from the host I/F 92, adds additional data such as parity bits for error correction to the data, and error-correction-code (ECC)-encodes the addition result. Then, the DSP 93 generates an ECC block, which is an error correction block, and modulates the ECC block using a predetermined method.

The RF AMP 94 converts data output from the DSP 93 into an RF signal. The writing/reading unit 80 that includes the pickup unit records the RF signal transmitted from the RF AMP 94 on the disk 100. The servo 95 receives a servo-control command from the system controller 91 and servo-controls the pickup unit of the writing/reading unit 80.

In particular, the system controller 91 finalizes the disk 100 when data recording in a data area of the disk 100 is completed. Here, a middle area indicates the completion of data recording in the data area and data is recorded in the middle area formed such that the pickup unit can move among two or more recording layers. If the middle area of a predetermined size is not large enough, the system controller 91 extends the middle area and controls the writing/reading unit 80 to record data in the extended middle area.

For data reproduction, the host I/F 92 receives a read command from the host. The system controller 91 is initialized for data reproduction. The writing/reading unit 80 irradiates a laser beam to the disk 100, receives the laser beam reflected by the disk 100, and outputs an optical signal. The RF AMP 94 converts the optical signal received from the writing/reading unit 80 into an RF signal and outputs modulated data obtained using the RF signal to the DSP 93. Also, the RF AMP 94 supplies a servo signal obtained using the RF signal to the servo 95.

The DSP 93 demodulates the modulated data, performs ECC error correction on the demodulated data, and outputs data obtained after the ECC error correction. The servo 95 receives the servo signal from the RF AMP 94 and a servo control command from the system controller 91 and servo-controls the pickup unit of the writing/reading unit 80. The host I/F 92 transmits the data output from the DSP 93 to the host. The data recording and/or reproducing apparatus as shown in FIG. 6 may be a single apparatus or may be separated into a recording apparatus (i.e., recorder) and a reading apparatus (i.e., player).

As described in the foregoing, the present invention advantageously provides recording methods and techniques for a multi-layer information storage medium, that is, a disk, when such a disk having an OPC area for obtaining optimum recording conditions (such as recording power) in an outer circumference thereof is finalized, and in the event if a middle area of the disk is not large enough, the middle area can flexibly be extended to ensure better data recording and reproduction.

While the present invention has been particularly shown and described with reference to exemplary embodiments thereof, it will be understood by those of ordinary skill in the art that various changes in form and details may be made therein without departing from the spirit and scope of the present invention. For example, other information storage media, such as Blu-ray Discs (BDs), Advanced Optical Disks (AODs), and holographic data storage devices may be utilized, as long as the middle areas can be extended in the manner as described with reference to FIGS. 2A-2C, FIGS. 3A-3C, FIGS. 4A-4C, and FIGS. 5A-5C. In addition, both the middle areas and dedicated areas can be fixed and/or flexible in designated areas of an optical disk. Data can also be recorded on the dual-layer or multi-layer information storage medium in a parallel track path (PTP) manner, that is, a direction in which data is recorded on the first recording layer L1 may be the same as a direction in which data is recorded on the second recording layer L2. Similarly, the system controller can be implemented as a chipset having firmware, or alternatively, a general or special-purpose computer programmed to implement methods as described with reference to FIGS. 2A-2C, FIGS. 3A-3C, FIGS. 4A-4C, and FIGS. 5A-5C. Accordingly, it is intended, therefore, that the present invention not be limited to the various example embodiments disclosed, but that the present invention includes all embodiments falling within the scope of the appended claims.

What is claimed is:

1. An information storage medium comprising:
   a plurality of recording layers, each recording layer including:
      a user data area for recording user data,
      at least one dedicated area for a predetermined purpose, and
      at least one middle area arranged between the user data area and the dedicated area, the middle area used by a recording/reproducing apparatus that records/reproduces data on/from the information storage medium to move among the recording layers,
   wherein the at least one middle area is extended into at least a portion of the dedicated area when the information storage medium is finalized.

2. The information storage medium as claimed in claim 1, wherein the dedicated area comprises a test area for testing data recording/reproducing characteristics of the information storage medium.

3. The information storage medium as claimed in claim 1, wherein data having lead-out properties is recorded in the at least one middle area.

4. The information storage medium as claimed in claim 1, wherein the at least one middle area is variably disposed after the user data area where user data is recorded, and an unrecorded area where the user data is not recorded remains unrecorded, and wherein the at least one middle area is extended to at least a portion of the unrecorded area when the information storage medium is finalized.

5. The information storage medium as claimed in claim 1, wherein the at least one middle area comprises a first middle area variably disposed after the user data area where the user data is recorded and a second middle area fixedly disposed at a predetermined position in an outer circumference of the information storage medium, and wherein, when the information storage medium is finalized, the first middle area is extended to at least a portion of the unrecorded area where the user data is not recorded.

6. The information storage medium as claimed in claim 1, wherein the at least one middle area is variably disposed after the user data area where the user data is recorded, and the dedicated area is disposed after the at least one middle area, and wherein the middle area is extended to at least a portion of the dedicated area when the information storage medium is finalized.

7. A recording/reproducing apparatus for recording or reproducing data on or from an information storage medium, the recording/reproducing apparatus comprising:
   a writing/reading unit to record data on the information storage medium or read recorded data from the information storage medium; and
   a control unit to control the writing/reading unit to:
      record the data on the information storage medium or read the recorded data from the information storage medium;
      use at least one middle area of the information storage medium to move among a plurality of recording layers of the information storage medium, the middle area being arranged between a user data area of the information storage medium and a dedicated area for a predetermined purpose of the information storage medium; and
      when the information storage medium is finalized, extend the at least one middle area into at least a portion of the dedicated area.

8. The recording/reproducing apparatus as claimed in claim 7, wherein the control unit further controls the writing/reading unit to record and read data having lead-out properties in at least the extended middle area.

9. The recording/reproducing apparatus as claimed in claim 7, wherein the control unit uses the dedicated area as a test area for testing data recording/reproducing characteristics of the information storage medium.

10. The recording/reproducing apparatus as claimed in claim 7, wherein the control unit variably places the at least one middle area after a point in a user data area up to which user data is recorded, leaves the rest of the user data area unrecorded, and extends the at least one middle area to at least a portion of the unrecorded area when the information storage medium is finalized.

11. The recording/reproducing apparatus as claimed in claim 7, wherein the control unit variably places a first middle area after the point in a user data area up to which the user data is recorded in addition to a second middle area fixed at a predetermined position in an outer circumference of the information storage medium, leaves the rest of the user data area unrecorded, and extends the first middle area to at least a portion of the unrecorded area when the information storage medium is finalized.

12. The recording/reproducing apparatus as claimed in claim 7, wherein the control unit variably places the at least one middle area after the point in a user data area up to which the user data is recorded, places the dedicated area after the at least one middle area, and extends the at least one middle area to at least a portion of the dedicated area when the information storage medium is finalized.

* * * * *